W. Lyon.

Sewing Machine.

No. 646

Reissued Jan. 4, 1859

W. Lyon.

Sewing Machine.

No. 646 Reissued Jan. 4, 1859.

UNITED STATES PATENT OFFICE.

A. W. GOODELL AND N. R. SCOVEL, OF BROOKLYN, N. Y., ASSIGNEES OF F. G. SIMPSON, B. DODD, AND C. B. MERRIMAN, ASSIGNEES OF WM. LYON.

IMPROVEMENT IN SEWING-MACHINES.

Specification forming part of Letters Patent No. 12,066, dated December 12, 1854; Reissue No. 646, dated January 4, 1859.

*To all whom it may concern:*

Be it known that WILLIAM LYON, of Newark, in the county of Essex and State of New Jersey, did invent certain new and useful Improvements in Sewing-Machines, on which Letters Patent were granted December 12, 1854; and the following amended specification is hereby declared to be a full, clear, and exact description of the construction and operation of the said invention, reference being had to the annexed drawings, making part of this specification, wherein—

Figure 1:
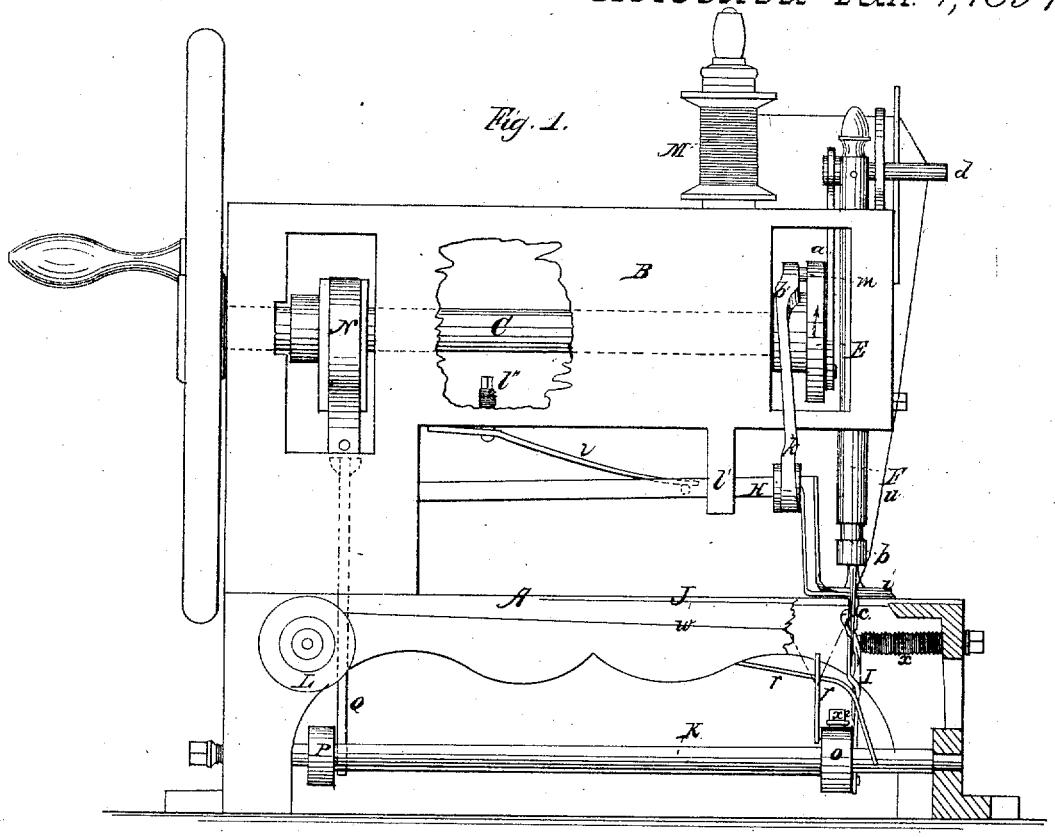
Figure 3:
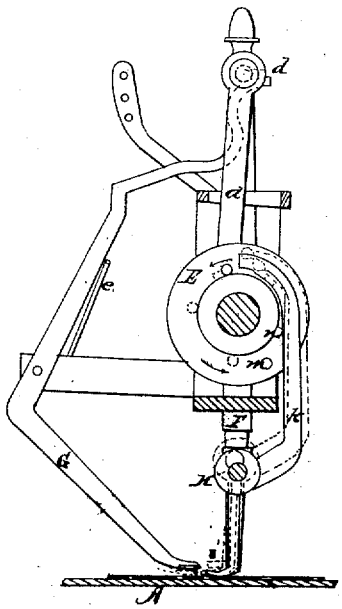
Figure 2:
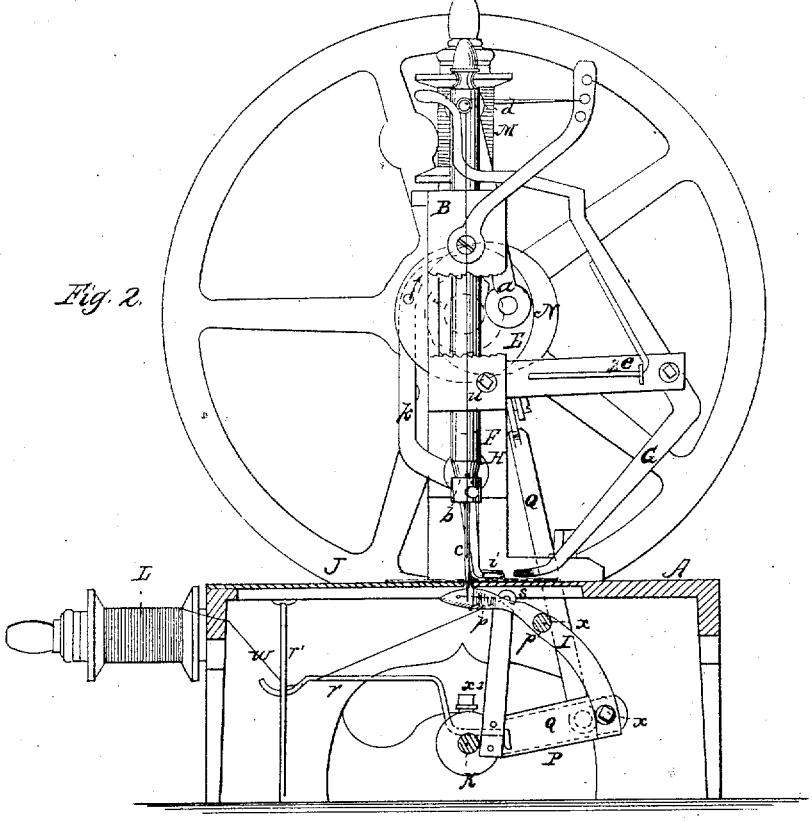
Figure 5:
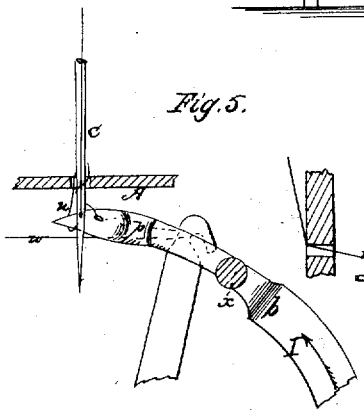
Figure 6:
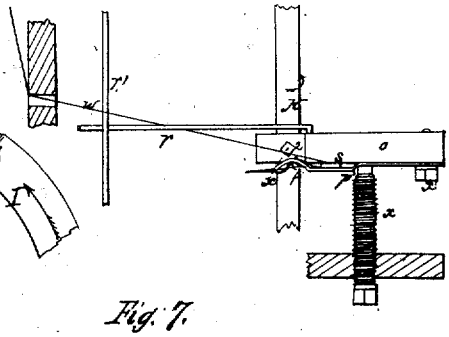
Figure 4:
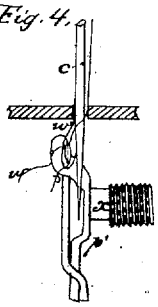
Figure 7:
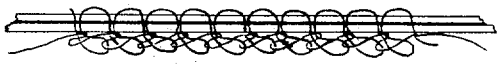

Figure 1 is a side view, with a portion of the bed shown in section. Fig. 2 is an end view, with the bed in section at the line of the needle. Fig. 3 is a view of the needle-bar and feeding device from the rear side. Figs. 4, 5, and 6 represent the looping device in various positions, and in larger size in Figs. 4 and 5. Fig. 7 represents the manner of interlacing the loops in performing the sewing.

Similar marks of reference denote the same parts.

The said invention relates to a device for feeding the cloth along, and also to the means for forming the stitch by a peculiar looping-instrument. The feeding device is composed of two instruments, one of which is alternately pressed onto and relieved from the cloth, and the other acts to force the cloth along while the first instrument is relieved and the needle is out of the cloth. The looping-instrument is formed with a cavity or notch behind the point, which point is provided with an eye and carries the second thread, and said looper is formed to spring laterally, so that a sidewise motion is given to it, as well as a reciprocating movement, whereby the said notch or cavity is brought into the proper position for the needle to pass thereinto between the looper and the second or lower thread, which it carries, to insure the taking of said loop, and then, as said looper draws back, it receives a lateral movement to prevent the end from coming in contact with the needle. By this looping device, in connection with a reciprocating eye-pointed needle, a double chain-stitch is produced with great facility and certainty for performing sewing.

A A is the table, upon one end of which is secured a strong overhanging frame, B, supporting the needle-carrier and the mechanism for operating that and the feeding apparatus. This leaves a clear space all around the needle upon the table for working the cloth. All parts are set in motion and propelled from the main shaft C, suspended in the frame B, the back end being supplied with a crank or pulley for revolving it. At the opposite end, and beyond the journal, is a wheel, E, from which the feed motions are given and the needle bar or carrier is worked.

At F is the needle-bar, standing in a vertical position immediately in front of the wheel E and on a line with its axis. To keep it in its vertical position while playing up and down, it is supported by two bearings, one being at the top of the frame B and one below, as shown. A connecting-rod, *a*, fixed to a crank-pin in the wheel E and to another pin in the head of the needle-bar, is the means for giving the proper reciprocating motion to the latter.

At *d* is a pin extending through the head of the needle-bar. This performs a twofold office. One is to carry the thread along with the bar as it moves up and down, and thereby keep it always in proper tension and prevent it from kinking, and the second use is to operate the feed-clamp and make it hold down the cloth at those times when the regular feeding-fingers are raised to prepare for taking a new hold of the cloth in the manner now to be described. This clamp is a crooked lever, as seen at G, having its fulcrum near the middle on a projecting arm, as shown. The bottom terminates as a foot near the top of the table, and the upper end is curved for a distance equal to the play of the pin *d*, a spring, *e*, always acting to keep that end pressing against the said pin. By means of the curve at the top of G, a vibrating motion is imparted to it as the pin *d* plays up and down along with the needle-bar. This vibration causes the foot to rise and fall upon the table, so that, whenever a piece of cloth is placed under, it is alternately clamped or held down and released by every stroke of the needle-bar. This releasing and clamping work is alternating with the motion of the feeding-finger, which also acts as a clamp when down. Thus the moment the feeding-finger begins to push the cloth along the table, which it does toward the clamp, the foot of the latter rises and allows the cloth to go on. It then comes down and holds it while the feeding-finger is going through its motions preparatory to giving the next feed, and while the stitch is being taken, as will now be described.

The feeding-finger has a peculiar set of motions given it. In the first place, while pressing onto the cloth, it remains stationary for a time—*i. e.*, while the needle, having passed through the cloth, is returning. It then moves horizontally the distance for the length of stitch, thus pushing the cloth, which is then seized by the clamp G at the moment the needle has entered. It then rises to a position immediately over that first described, whence it again descends vertically onto the cloth before the needle has been withdrawn, and acts to feed the cloth when the needle has again been withdrawn, and so on. The mechanism is as follows:

H is a rod having one end cranked, the lower end of which terminates in the feeding-finger at *i*. There is a branch which extends upward and terminates behind the wheel E, as represented at *k*. The rod H lies horizontally under the overhanging frame B, to which it is attached at the vertical post, and it is kept in place and allowed to have free movement in every direction by a socket-and-ball termination. Near the arm *k* is another bearing, being a slot cut vertically in the bracket *l'*, so as to prevent lateral but permit vertical and rotary motions.

At *l* is a spring the force of which is directed downward to keep the finger pressing upon the cloth.

To perform the movements before described, there are two regulating cams or projections upon the wheel E, which strike upon the arm *k*, in revolving, at the proper times for raising, lowering, and pushing forward the feed-finger. One of these projections or studs is upon the inside face of the wheel, as seen at *m*, and the other projects from the circumference of its hub, as seen at *n*, Fig. 3. The stud *n* is so set that, in revolving with the shaft C, it strikes against the inner edge of the arm *k*, and the other stud, *m*, strikes against its side. The space between them is also such that *n* strikes first. The effect of this is to push the arm away, the rod H being then an axis, and thus the finger *i* is moved horizontally, as shown in the duplicate lines, Fig. 3. This feeds the cloth along for the stitch. The stud *n* slides along the edge of the arm *k*, which is bent into a circular form at this part, as seen in Fig. 3, and keeps the finger in place still upon the cloth until the needle has entered the cloth. The other stud, *m*, now arrives, and, striking against the side of the arm *k* at the inclined bend or bevel seen at *k'*, raises it up, thus lifting the rod H and finger *i*. This stud then rides over the bevel, and in its onward movement carries the arm back to a position directly over that from which it was pushed by the stud *n*. As the stud clears the end of *k* the finger drops and presses upon the cloth as the needle is about to be lifted out, holding it firm close to the thread. The descent of the needle-shaft causes the clamp-lever G to vibrate, lifting the clamp from the cloth as the stud *n* is about to strike the arm *k* and give the feed, as before described.

In order to lengthen or shorten the stitch, it is only necessary to screw out or in the stud *n*, for by projecting farther out it increases the throw of the feeding-finger *i*, and, on the contrary, screwing it in lessens that throw. To increase the grip of the finger, a set-screw, *l''*, pressing upon the spring *l*, adds to the set or tension of the latter, and thus forces down the finger *i*.

The manner of performing the sewing is as follows: The eye-pointed needle *c* is threaded from the upper spool, M, the thread being shown in red lines. The looper I, that carries the under thread from the spool L, (shown in blue lines,) is so timed and moved, as hereinafter set forth, that, as the needle *c* commences to rise, the looper I takes a loop of needle-thread, passes into and holds the same while the needle rises and again descends, and passes between the second thread and looper, taking a loop of said second thread. The looper, drawing back, drops the loop of needle-thread around the loop of second thread, and then takes a new loop of needle-thread, when the needle, rising, drops the loop of second thread around the new loop of needle-thread, and so on, the eye-pointed needle perforating the cloth and stitching on the upper surface of the cloth, while the under side is a series of double chain-stitches, as represented. The looper I is formed with a notch or cavity at *p*, and also with an incline at *p'*, and *x* is a stationary screw or equivalent device which comes against the side of the looper. The object of this device is to insure the taking of a loop of second thread by the needle, and the operation is that, as the looper I is vibrated back and forth, the cavity *p* is in a position to receive the point of the needle behind the second thread, as shown in Figs. 2 and 6. If the looper I was now simply drawn back, and the needle continued its descent, the looper would injure the needle, and in coming up again would pass on the wrong side to take a loop of needle-thread. The looper I is therefore formed as a spring, and the incline *p'*, moving against the screw *x*, or its equivalent, forces the looper back and clears the needle at the notch of the looper, and causes the next loop of needle-thread to be properly taken by the point of the looper as the same comes up and enters the loop, as seen in Figs. 4 and 5. The looper I is attached to an arm, *o*, and this sets around the shaft *k*, that oscillates in bearings in the bed, and receives motion from the eccentric N of the shaft C, and rod Q, that connects with an arm, P, on on the shaft *k*.

*u'* is a spring thread-guide on the under side of the bed A, and *r* is a similar spring attached to the arm *o*. The thread *w* passes from the spool L through a hole in the bed, Figs. 1 and 6, beneath these spring-guides, around a hook or eye, *s*, along the back of the looper I, through the eye in said looper, and up through the hole in the bed through which the needle passes; and to facilitate access to the under thread and looper, the bed is provided with a turning or sliding plate, J, covering an opening in the bed.

The general operation is as follows: The needle having been properly adjusted, and the thread *w* brought up through the needle-hole and carried with the outer thread under the feeding-finger, the materials to be sewed or ornamented are laid upon the table, the operator sitting on that side of it along which the thread *w* is carried, so as to have the right hand free to guide the cloth, while with the left the machine is kept in motion. With a treadle attached, this latter may be done by the foot, or other power may be employed, and thus free both hands. Care must now be taken to give the right degree of tension to the thread by setting up the pinch-nuts upon the spools. If too much, the thread will break, and if too little, the work will be badly sewed. The materials once under the feeding apparatus will be kept moving in a straight line; but if curves are to be followed, the hand must guide the material in all directions other than straight. It will now be apparent that the looper can be adjusted so as to act in the correct manner relatively with the needle by simply sliding the arm *o* lengthwise on the shaft K, to bring the looper to the necessary proximity to the side of the needle, and turned upon said shaft so as to bring the point into position to take the loop of needle-thread, and the notch or cavity *p* to receive the point of the needle on its descent; and by means of the screw $x^2$ the looper is retained in place where adjusted. The proximity of the looping point to the bed of the machine is regulated by turning the looper at the screw $x'$.

It is well known that prior to the present patent of WM. LYON a revolving looping-instrument had been used to take and spread the loop of thread, and also that a reciprocating hook had been used in connection with a looper to spread the thread, and a peculiarly-formed rigid hooked looper had been used in which a compound motion was given in taking the loop of needle-thread, and then the looper projected past the side of the needle and was retracted in a straight line; but there is no previous instance known of in which a vibrating looping-instrument constructed and actuated substantially as set forth, passed through the loop of needle-thread, and then received a sidewise motion for carrying the second thread (from the eye of said looper) across the path of the needle, said looper, as it draws back, first receiving a sidewise motion to clear the needle, and then completing its movement in a straight line at the side of the needle.

Having thus described the nature and operation of the said invention, and shown the general peculiarities and benefits resulting from the same, what is claimed as new, and desired to be secured by Letters Patent as the invention of the said WILLIAM LYON, is as follows:

1. The combination of a feeding-foot, *i*, pressed onto the cloth and moved to feed the cloth, and then released from said cloth and returned to its former position, with a clamping-foot, G, that is raised when the feed of the cloth takes place, as set forth.

2. The vibrating bar H, feeding-fooot *i*, arm *k*, and revolving studs *m n*, arranged and acting, substantially as specified, to communicate motion to the feeding-foot, as set forth.

3. The spring-looper I, formed with the cavity, as set forth, in combination with a fixed screw or its equivalent to communicate the required sidewise movement to the looper, as specified.

4. The arrangement of the segmental spring-looper I, arm *o*, and adjusting-nuts $x'$ $x^2$, for the purpose of accurately adjusting the said looper in all directions, as set forth.

In witness whereof we, the assignees of the patent of WILLIAM LYON, of December, 12, 1854, have hereunto set our signatures in the presence of the witnesses subscribing hereto.

A. W. GOODELL,
NELSON R. SCOVEL.

Witnesses:
LEMUEL W. SERRELL,
THOMAS G. HAROLD.
As to N. R. Scovel:
HENRY W. SCOVEL,
THOS. D. NEWCOMB.